F. SEIFFERT.
SLUICE VALVE.
APPLICATION FILED APR. 24, 1908.
916,494.
Patented Mar. 30, 1909.
3 SHEETS—SHEET 1.
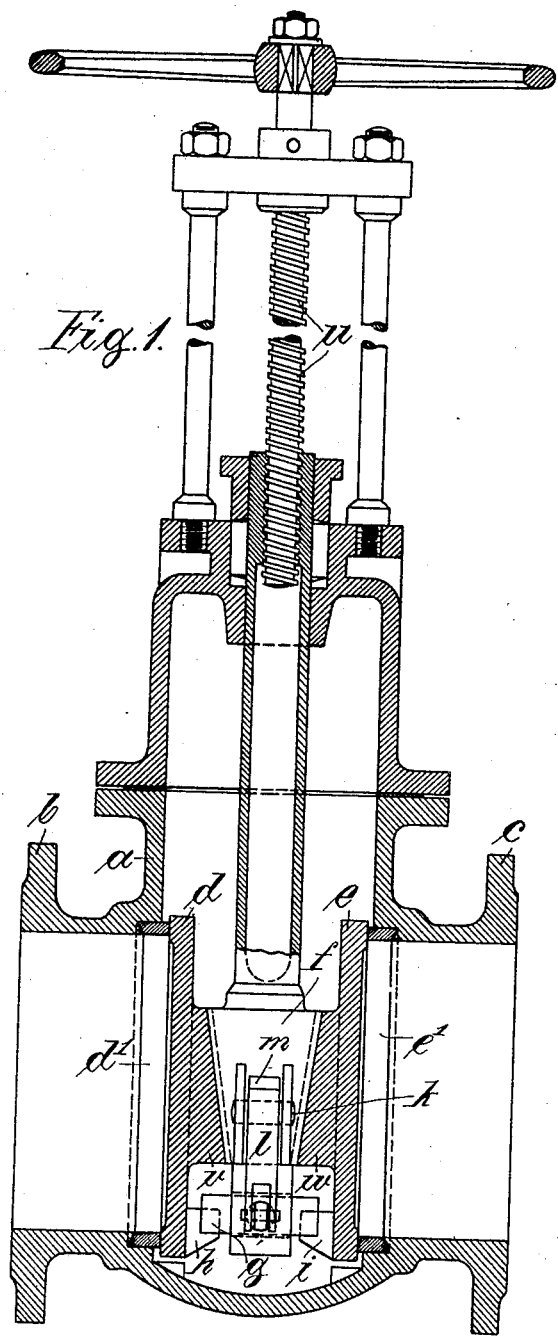

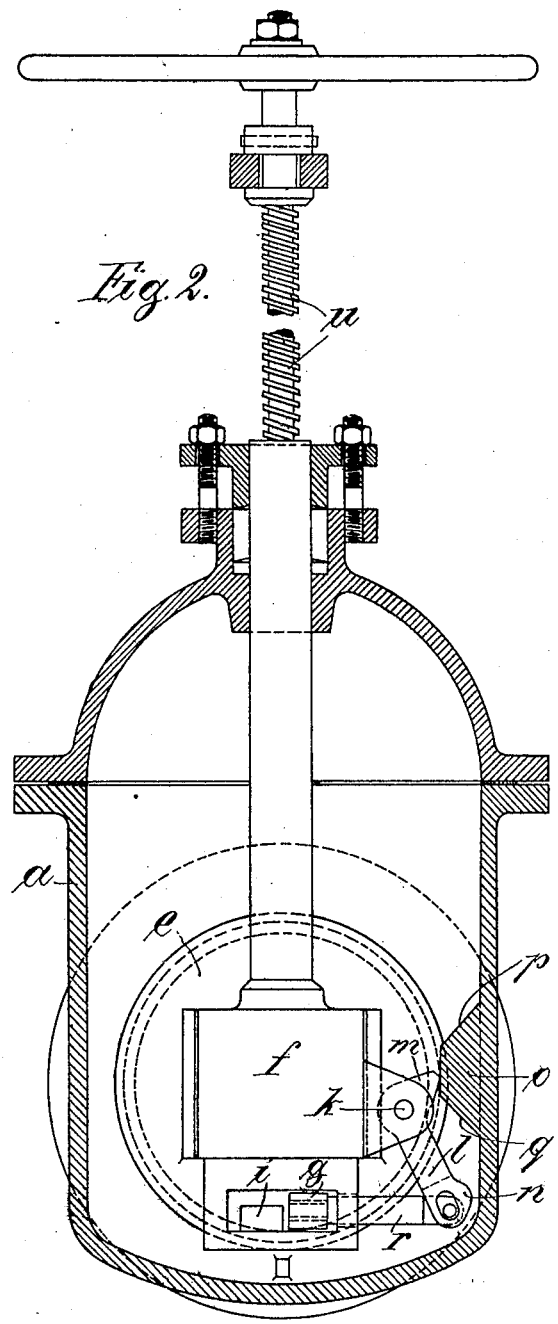

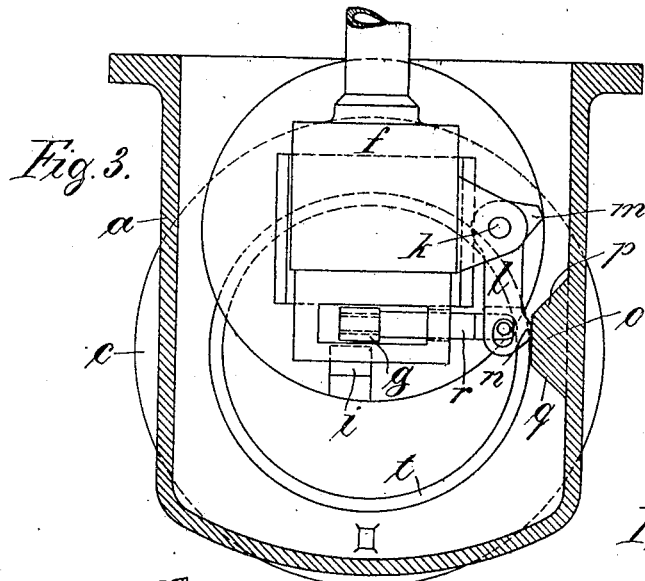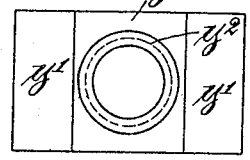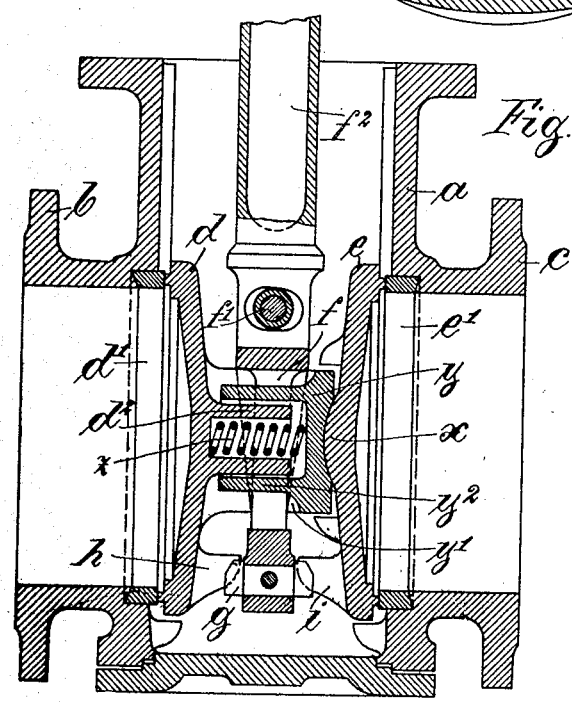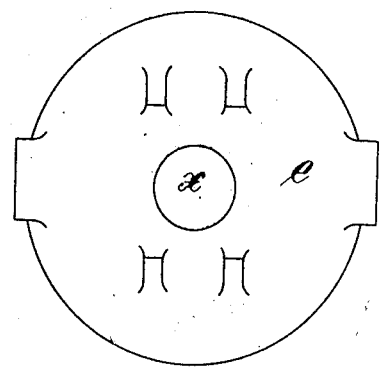

UNITED STATES PATENT OFFICE.

FRANZ SEIFFERT, OF BERLIN, GERMANY.

SLUICE-VALVE.

No. 916,494.     Specification of Letters Patent.     Patented March 30, 1909.

Application filed April 24, 1908. Serial No. 428,993.

*To all whom it may concern:*

Be it known that I, FRANZ SEIFFERT, a subject of the King of Prussia, German Emperor, and resident of 154ª Koepenickerstrasse, Berlin, Kingdom of Prussia, German Empire, have invented new and useful Improvements in Sluice-Valves, of which the following is an exact specification.

This invention relates to sluice valves of the kind in which the valve is composed of two closing parts moved radially and then axially with regard to their seats by means of a radially movable wedge interposed between the two parts.

The present invention consists in providing positive means in the form of a movable clutch piece for opening as well as closing the valve, said movable clutch being arranged to be taken out of operation after the radial movement and when the closing parts of the valve are arranged opposite their coöperating seats. In this position the further movement of the wedge presses the closing parts against their coöperating seats.

A further object of the present invention is to provide in combination with the moving clutch mentioned above an improved ball and socket arrangement by which the closing parts are brought securely against their seats independently of inexactitudes in the wedge surfaces.

In the accompanying drawings the invention is illustrated in two modifications by way of example.

Figure 1 shows a vertical cross section through a sluice valve according to the present invention, Fig. 2 is a section at right angles to the section shown in Fig. 1, one of the closing members of the valve being removed in Fig. 2 in order to reveal the sliding clutch device according to the present invention, Fig. 3 is a partial view similar to Fig. 2 showing the parts in the position which they occupy when the valve is opened, Fig. 4 is a partial cross section similar to Fig. 1 and illustrates a modified form of sluice valve in which the closing parts are adapted to conform to the plane of their co-acting seats independently of the wedge surfaces, Fig. 5 is a separate view of one of the closing members of the valve, Fig. 6 is a detail showing the socket of the ball joint part employed in Fig. 4.

In carrying the invention into effect according to the form illustrated in Fig. 1 the casing $a$ of the valve is of ordinary shape and provided with suitable flanges $b$ and $c$. The valve is composed of closing parts $d$ and $e$ adapted to be pressed against their co-acting seats $d'$ and $e'$ by means of a wedge $f$ which may be moved upward and downward by means of a screw $u$ in the well known manner. Otherwise the construction of the operating gear for the wedge $f$ is of ordinary form. The wedge $f$ is provided at its lower end with a guide in which there slides a coupling member $g$. This coupling member $g$ is connected by a rod $r$ to a lever $l$ pivoted at $k$ to a bracket on the wedge $f$. The lever $l$ is provided with a nose piece $m$ and a rounded part $n$, these two parts being adapted to coöperate with a cam projection $o$ on the casing $a$. The cam projection $o$ is provided with two sloping surfaces $q$ and $p$. On the closing members $d$ and $e$ there are formed projections $h$ and $i$ by which as hereinafter described the closing members $d$ and $e$ are positively coupled to the moving wedge $f$ during downward movement of the same. During upward movement of the wedge $f$ the slide $g$ engages with the parts $v$ and $w$ on the closing members $d$ and $e$ respectively.

The operation of this device is as follows: From the closed position shown in Fig. 1 the wedge $f$ by the turning of the screw $u$ is first raised without raising the closing parts of the valves $d$ and $e$. After the wedge $f$ has risen for some little distance the slide $g$ commences to bear against the projections $v$ and $w$ on the closing members $d$ and $e$ and further as the nose piece $m$ lies against the raised portion of the projection $o$ the slide $g$ is in the position shown in Fig. 2. During upward motion of the wedge $f$ in company with the closing parts $d$ and $e$ the nose or rounded portion $n$ comes against the sloping edge $q$ of the cam projection $o$ and thereby the slide $g$ or coupling member is pushed toward the left in Fig. 2 and into the position shown in Fig. 3. In this position the slide $g$ lies over the projections $h$ and $i$ on the closing members $d$ and $e$ respectively. In this way when the wedge $f$ is again moved downward the slide or coupling member $g$ engages with the projections $h$ and $i$ and thereby positively moves the closing members downward radially with regard to the through going passage in the valve casing while at the same time preventing the wedge $f$ causing jamming of the parts before the closing pieces $d$ and $e$ descend into proper position opposite their seats. During the descent of the pieces $d$ and $e$ that is during the radial movement of these pieces with regard to the throughgoing passage in the valve casing the nose piece $m$ comes against the sloping edge $p$ of the cam $o$ and thereby the sliding coupling member $g$ is again withdrawn from engagement with the parts $h$ and $i$ and the further downward motion of the wedge $f$ which is necessary for the purpose of tightening the parts $d$ and $e$ is thereby permitted.

In Fig. 4 there is illustrated a form of this invention in which the closing parts $d$ and $e$ may adjust themselves to the planes of their respective co-acting closing seats $d'$ and $e'$ independently of the wedge surfaces. In this form of this invention the sliding coupling member $g$ is arranged as described with reference to Figs. 1–3 and requires no further description. On the closing member $e$ there is formed a convex projection $x$ on which there bears a concave bearing surface formed on a bearing plate $y$. The bearing plate $y$ is provided with a sleeve $y^2$ passing over a sleeve $d^2$ on the closing part $d$. A spring $z$ is provided between the parts $y$ and $d$ for the purpose of preventing rattling. The bearing piece $y$ is provided with wedge bearing surfaces $y'$ adapted to co-act with the wedge formed surfaces of the wedge $f$. The wedge $f$ in this case is not formed in one piece with the actuating rod $f^2$ but is forked shaped at its upper end which is coupled to the eye on the end of the spindle $f^2$ by means of a pin $f'$. The pin $f'$ is fixed to the wedge $f$ and moves in a slot on the eye at the end of the actuating rod $f^2$ as can be seen in the drawing. It will be seen by this arrangement that the wedge $f$ can accommodate itself somewhat to the position of the wedge surfaces. By means of this device it will be seen that when the sliding piece $g$ has been liberated from the projections $h$ and $i$ as described with reference to Figs. 1–3 the downward motion of the wedge $f$ will press the closing parts $d$ and $e$ against their co-acting seats $d'$ and $e'$ and allow at the same time these closing plates $d$ and $e$ to accommodate themselves directly to the planes in which these co-acting seats lie. Thus any inexactitude will be taken up by the intermediate piece $y$ and a correspondingly modified position of the wedge $f$.

I claim:

1. A sluice valve having in combination with a valve casing having valve seats therein, two closing parts adapted to be moved radially and axially with regard to their seats, a wedge interposed between these closing parts and provided with a guide slot therein, a sliding clutch piece guided to slide in said slot in the wedge, projecting lugs on the closing parts with which said sliding clutch is adapted to engage, a lever pivotally carried by the wedge and articulated to said sliding clutch piece, and a fixed cam adapted to engage said lever to move said clutch piece in and out of engagement with the closing parts when said parts are axially opposite their seats, substantially as described.

2. A sluice valve having in combination with a valve casing having valve seats therein, closing parts adapted to be moved radially and axially with regard to said seats, a wedge arranged between said closing parts, a bearing plate having a spherical socket thereon, interposed between the wedge and one of the closing parts, a ball shaped projecting bearing on the closing part, with which said socket engages, a sliding clutch piece guided in a slot on the wedge, projecting lugs on the closing parts with which said slide is adapted to engage, a pivoted lever arranged at one side of the wedge, a link connecting said lever to the clutch slide, and a cam projection on the valve casing with which said lever is adapted to engage to move the sliding clutch piece in and out of engagement with the projecting lugs on the closing parts, substantially as described.

In witness whereof, I have hereunto set my hand in the presence of two witnesses.

FRANZ SEIFFERT.

Witnesses:
HENRY HASPER,
WOLDEMAR HAUPT.